(12) United States Patent
Nork et al.

(10) Patent No.: US 8,766,597 B2
(45) Date of Patent: Jul. 1, 2014

(54) OPTIMIZED BI-DIRECTIONAL BALANCING METHOD AND SYSTEM

(75) Inventors: Samuel Hodson Nork, Andover, MA (US); Brian J. Shaffer, Lynnfield, MA (US)

(73) Assignee: Linear Technology Corporation, Milpitas, CA (US)

( * ) Notice: Subject to any disclaimer, the term of this patent is extended or adjusted under 35 U.S.C. 154(b) by 357 days.

(21) Appl. No.: 13/426,277

(22) Filed: Mar. 21, 2012

(65) Prior Publication Data

US 2013/0099746 A1 Apr. 25, 2013

Related U.S. Application Data

(60) Provisional application No. 61/550,128, filed on Oct. 21, 2011.

(51) Int. Cl.
*H02J 7/00* (2006.01)
*H01M 10/42* (2006.01)
*B60L 11/18* (2006.01)

(52) U.S. Cl.
CPC .......... *B60L 11/1866* (2013.01); *Y02T 10/7061* (2013.01); *H02J 7/0018* (2013.01); *H01M 10/425* (2013.01); *H01M 2010/4271* (2013.01); *Y02T 10/7005* (2013.01); *H02J 7/0014* (2013.01); *Y02E 60/12* (2013.01)
USPC ............................. 320/118; 320/134; 320/136

(58) Field of Classification Search
USPC ........................................................ 320/118
See application file for complete search history.

(56) References Cited

U.S. PATENT DOCUMENTS

| | | | |
|---|---|---|---|
| 5,498,950 A * | 3/1996 | Ouwerkerk | 320/119 |
| 5,631,534 A | 5/1997 | Lewis | |
| 5,656,915 A | 8/1997 | Eaves | |
| 6,121,751 A * | 9/2000 | Merritt | 320/116 |
| 7,622,893 B2 | 11/2009 | Williams | |
| 2002/0196026 A1* | 12/2002 | Kimura et al. | 324/426 |
| 2006/0097698 A1* | 5/2006 | Plett | 320/118 |
| 2007/0139015 A1* | 6/2007 | Seo et al. | 320/132 |
| 2008/0036421 A1* | 2/2008 | Seo et al. | 320/132 |
| 2008/0053715 A1* | 3/2008 | Suzuki et al. | 180/2.1 |
| 2011/0076525 A1 | 3/2011 | Zhang et al. | |
| 2011/0226559 A1* | 9/2011 | Chen et al. | 187/290 |
| 2012/0105010 A1* | 5/2012 | Kinoshita | 320/136 |

FOREIGN PATENT DOCUMENTS

| | | |
|---|---|---|
| JP | 2009-071936 A | 4/2009 |
| JP | 2010-529817 A | 8/2010 |

OTHER PUBLICATIONS

Extended European Search Report for Application No. 12007270.7-1360 dated Feb. 28, 2013.
Korean Office Action with Full English Translation issued in Korean Patent Application No. 10-2012-0064126 mailed Jun. 4, 2013.
Korean Office Action with Full English Translation issued in Korean Patent Application No. 10-2012-0064126 mailed Dec. 24, 2013.

* cited by examiner

*Primary Examiner* — Arun Williams
(74) *Attorney, Agent, or Firm* — Schiff Hardin LLP

(57) ABSTRACT

A battery balancing method and system which includes a plurality of cells connected in series, a balancer for each cell, a monitor configured to determine a state of charge (SOC) of each cell, and a microprocessor. The microprocessor iteratively calculates a SOC error for each cell, based on a theoretical balancing of the Min Q cell and the Max Q cell, until the SOC error is less than or equal to a first threshold; and iteratively re-calculates SOC error based on a net charge or discharge time for each balancer until the SOC error is less than or equal to a second threshold; and when the SOC error is less than or equal to the second threshold, instructs each balancer to physically balance each respective cell based on the respective calculated net charge or discharge time when the second threshold is met.

29 Claims, 8 Drawing Sheets

OPTIMIZED BI-DIRECTIONAL BALANCING METHOD AND SYSTEM

CROSS-REFERENCES TO RELATED APPLICATIONS

The present application is related to U.S. application Ser. No. 13/242,836 filed Sep. 23, 2011 entitled "Stackable Bi-Directional Multicell Battery Balancer," the content of which is incorporated herein by reference in its entirety. The present application also claims the benefit of priority to U.S. Provisional Patent Application No. 61/550,128, filed on Oct. 21, 2011, the content of which is herein incorporated by reference in its entirety.

TECHNICAL FIELD

This disclosure generally relates to the electrical arts, and more particularly, to concepts and techniques for balancing power sources.

DESCRIPTION OF RELATED ART

Large, high voltage batteries comprising a plurality of series connected battery cells are commonly used in various applications, including electric vehicles and large industrial battery back-up and grid load leveling applications. Safety and lifetime preservation of the battery packs may require that all cells in the pack be monitored and balanced such that each cell operates in a fixed "state of charge" (SOC) range over the operating life of the battery. If a cell is overcharged, discharged too deeply or rapidly, or simply overheated, it may more readily degrade, catch fire, or even explode.

Since cells are typically not identical, there is a concern of imbalance between the cells. For example, there may be differences in the SOC, cell-discharge rate, impedance, capacity, and temperature characteristics. These differences may exist even if the cells are from the same assembly line. The weak cells (i.e., cells with inherently lower capacity, degraded capacity, or high internal impedance) may charge and discharge faster than stronger cells. Thus, during a charge, a weak cell may reach a predetermined high voltage faster. Similarly, during a discharge, a weak cell may reach a predetermined low voltage faster. In this regard, the weak cells may be weakened further by relatively long charge and discharge cycles. For cells connected in series, the total useful capacity of the battery (i.e., series of cells) is limited by the weakest cell.

Cell balancing may be performed to equalize the voltage or state of charge on each cell over time to address some of the foregoing concerns. Typically, cell balancing is performed using either passive or active balancing.

FIG. 1 illustrates a circuit with passive balancing. In passive balancing, the cell that may need balancing (i.e., a cell at a higher SOC than the average cell) is discharged such that it conforms to the charge of other cells. However, discharged energy is dissipated as heat. Accordingly, passive balancing is an energy wasteful approach, especially when cell voltages are significantly different from each other.

In active balancing, each cell voltage (e.g., its SOC) may be measured separately. Capacitive or inductive charge transfer may be used to balance the charge in each cell (instead of dissipating the charge as heat). Power efficiency is thereby increased. In this regard, FIGS. 2a and 2b illustrate circuits with capacitive and inductive charge shuttling active balancing, respectively. Neither circuits of FIGS. 2a and 2b are stackable or interleaved.

Further, active balancing systems may be unidirectional. In the unidirectional systems of FIG. 3, charge from a particular cell can be either added or withdrawn, but not both, making them less effective in balancing. Further, active balancing systems of the prior art don't allow balancing of several cells simultaneously, making them less time efficient. In this regard, FIG. 4 illustrates a non-stackable, non-simultaneous bi-directional balancing consistent with a typical prior art approach.

Thus, prior art approaches typically include limitations of zero capacity recovery, high balancing power dissipation, long balancing times, and non-optimal energy recovery. Further, there may be isolated I/O control requirements for large strings of series connected cells.

In view of the foregoing, it would be desirable to have a method and system for a time and energy efficient bidirectional balancing of cells connected in series. It would also be desirable to have a method and system to achieve a state of charge (SOC) balance through a battery stack while minimizing balancer energy consumption and total balancer runtime.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
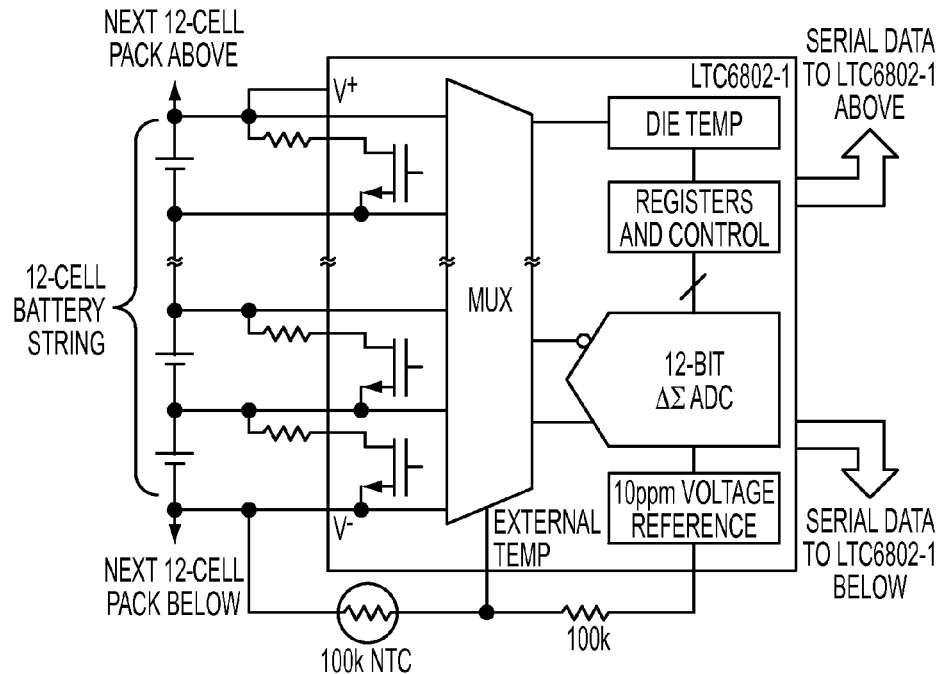
FIG. 1 illustrates a circuit with passive balancing.
Figure 2A:
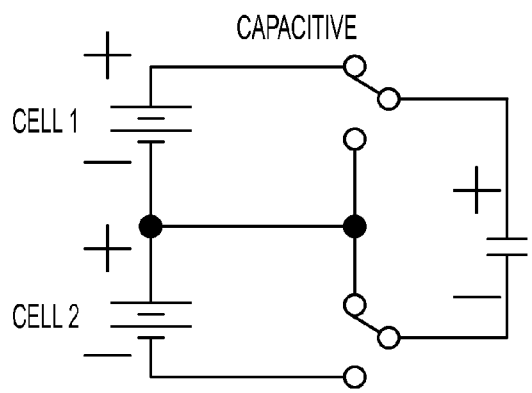
FIG. 2a Illustrates a circuit with non-stackable, non-interleaved capacitive charge shuttling active balancing.
Figure 2B:
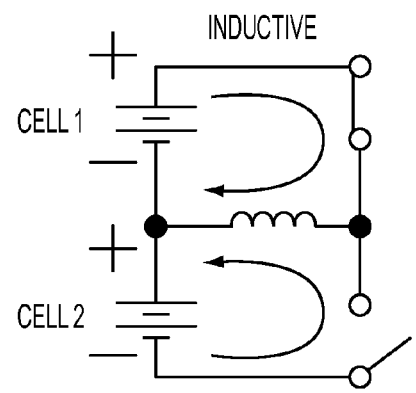
FIG. 2b Illustrates a circuit with non-stackable, non-interleaved inductive charge shuttling active balancing.
Figure 3:
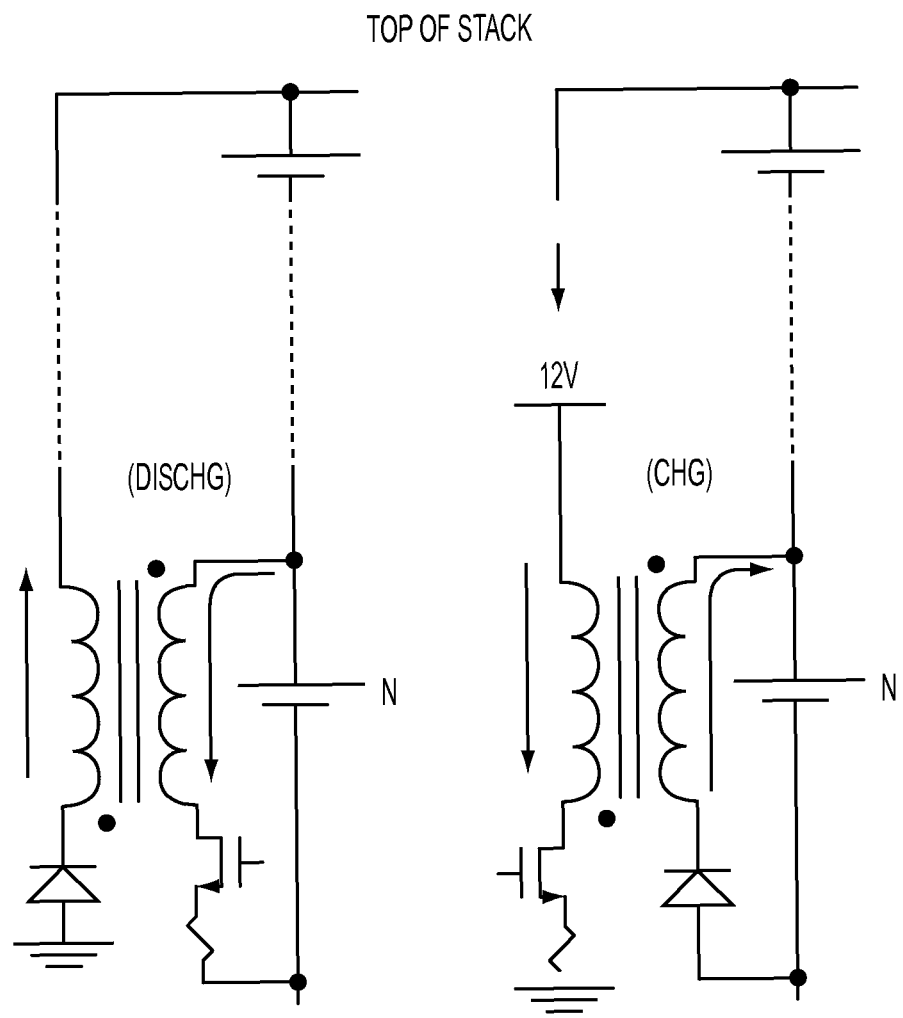
FIG. 3 Illustrates two circuits with unidirectional isolated fly-back balancing.
Figure 4:
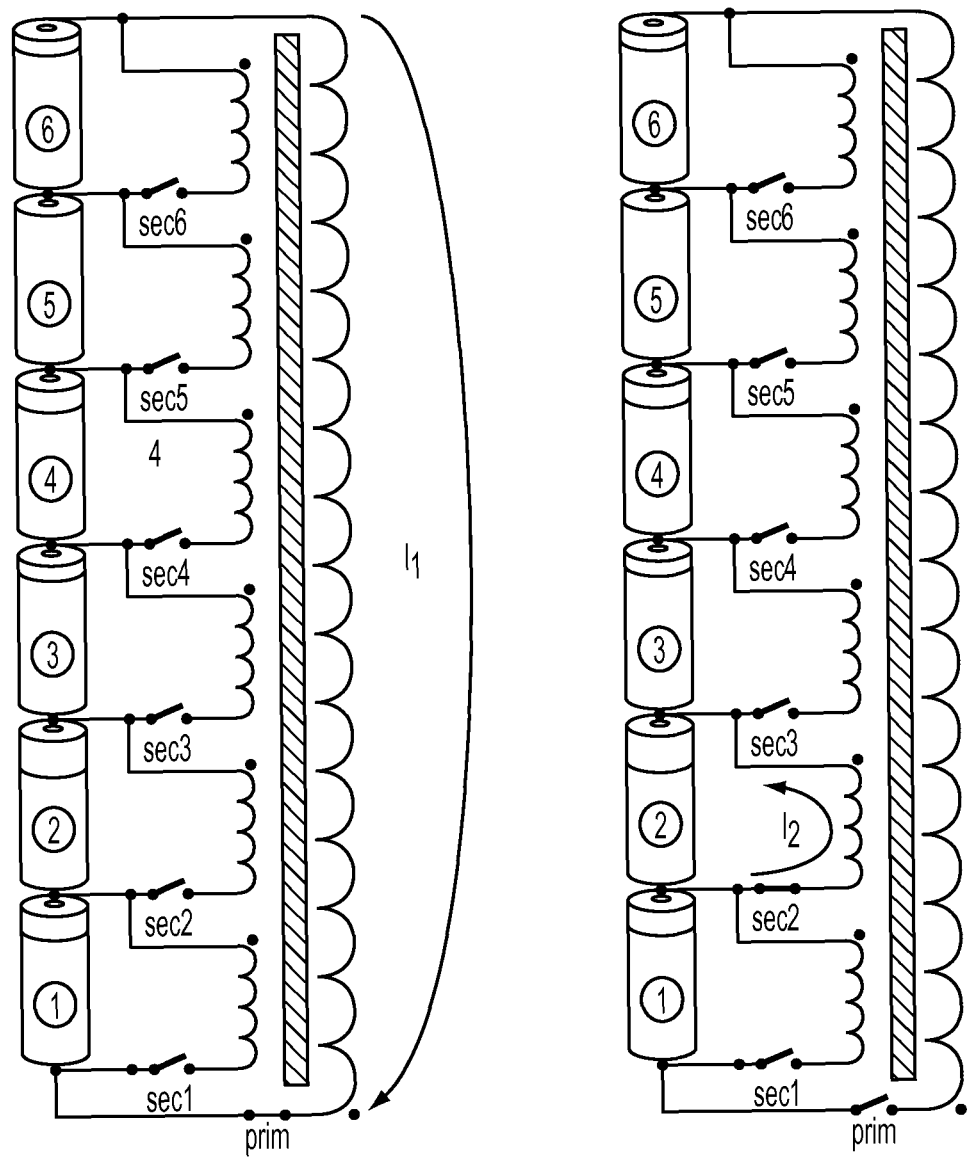
FIG. 4 Illustrates a circuit with non-simultaneous bi-directional balancing.
Figure 5:
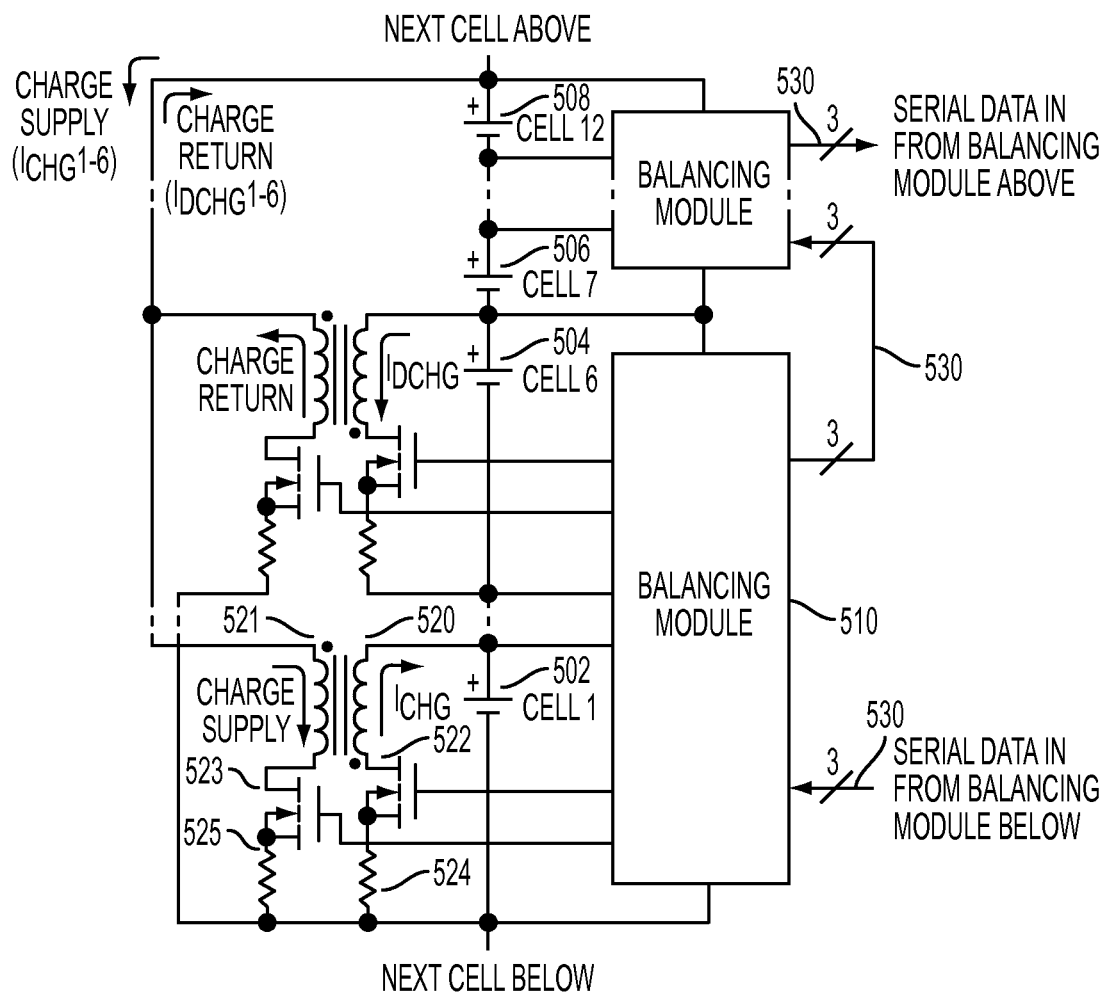
FIG. 5 Illustrates a circuit with a 6-cell bi-directional balancer consistent with an embodiment of the invention.

FIG. 5 Illustrates a circuit with transformer connections for balancing a plurality of battery sub-stacks, consistent with an embodiment of the invention. A plurality of cells (i.e., 502 to 508) may be stacked on top of one-another in series. The balancing module 510 may comprise a plurality of bi-directional cell balancers. For example, the balancing module may comprise six such cell balancers. Each balancer uses a predetermined transformer ratio to transfer charge between a cell and an adjacent sub-stack (in either direction). For example, the transformer ratio can be simply 1:1.

The bi-directional balancing of circuit 500 can provide power efficient cell to sub-stack and sub-stack to cell charge transfer regardless of whether the battery pack is being charged or discharged. Further, each cell within a sub-stack (e.g., cells 1 to 6) can be balanced simultaneously. Simultaneous operation reduces balancing time. Indeed, during the time it may take to balance a single cell, a plurality of cells within a sub-stack can be balanced. In one embodiment, simultaneous balancing can occur with other sub-stacks (e.g., cells 7 to 12) as well. Thus, in this embodiment, cells 1 to 12 are balanced simultaneously.

In one embodiment, the first terminal of the primary side of a transformer (e.g., 520) of each cell may be connected across the cell to be balanced (e.g., 502). The second terminal of the primary side of a transformer is in series with a transistor (e.g., a power FET 522) and a current sense resistor (e.g., 524). The secondary winding side of each transformer (e.g., 521) is connected to an adjacent cell. For example, the adjacent cell may be further up in the sub-stack and in series with a transistor (e.g., a power FET 523). This secondary side transistor 523 has a secondary side current sense resistor (e.g., 525) coupled to the source of the secondary side transistor 523. The current sense resistor (e.g., 525) of each secondary side transformer winding (e.g., 521) is referenced to the lowest voltage cell in the sub-stack. In one embodiment, the maximum voltage connection on the secondary side is limited only by the breakdown voltage of the secondary side transistor 523.

Further, the ON/OFF state and charge current direction control may be independent for each balancer. The state and direction may be communicated to each IC through a common stackable serial port 530. For example, a daisy chained stackable interface may allow all balancers to be controlled through a single I/O port 530 without restriction on the number of cells in a series connected battery stack. This feature is discussed in more detail later.

Balancing methods may include measurement or monitoring systems that accurately determine the relative SOC of each cell in the pack (e.g., by accurately measuring individual cell voltages and/or cell temperatures and/or cell impedances or any other useful cell parameters). Bi-directional active balancing methods provide significant improvements in balancing time and balancing energy consumption compared with other balancing topologies. Optimizing the total balancer run time (i.e., minimizing the total run time required to achieve SOC balance) provides further improvements in balancing performance as measured by balancer energy consumed, battery-pack energy recovered, etc.

Bi-directional topologies transfer charge between an individual cell and a group of adjacent cells (sub-stack). In bi-directional systems, charge can be moved in either direction between a cell and its sub-stack or adjacent sub-stacks to achieve SOC balance. Since the SOC of a cell should ideally be matched throughout the entire battery stack, sub-stacks may be interleaved to provide a charge transfer path throughout the battery stack.

For example, balancing interleaved battery systems is an iterative process since any individual cell balancing operation affects the state of charge in adjacent cells and sub-stacks. Different algorithms can be used to achieve SOC balance throughout the battery stack. However, determining the minimum balancing times (and charge transfer direction from the point of view of each cell) includes iterative prediction and correction calculations based on predetermined balancer parameters (e.g., balance current and transfer efficiency) and initial measured values for each cells' relative SOC.

In one embodiment, the initial cell capacity (i.e., the maximum cell capacity) of each cell is determined. The difference in charge ($\Delta Q$) between a cell and an average cell within the battery stack depends on both the SOC and the capacity of the Max Q cell since $\Delta Q$ is an absolute number. The $\Delta Q$ and Max Q cell is discussed in more detail in a later section.

Figure 7A:
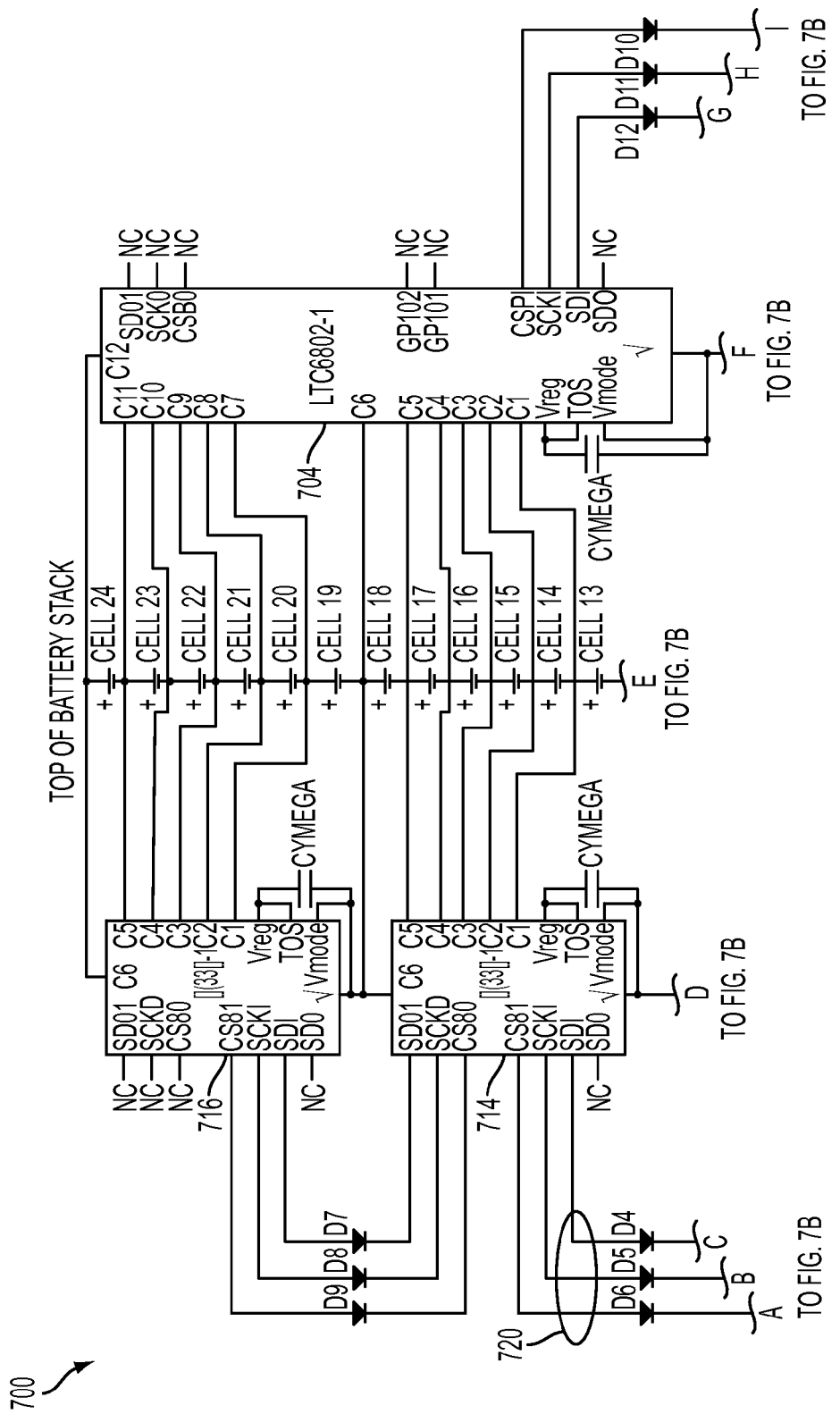
FIG. 7 is a system diagram illustrating stackable serial communication, consistent with an embodiment of the invention.
Figure 7B:
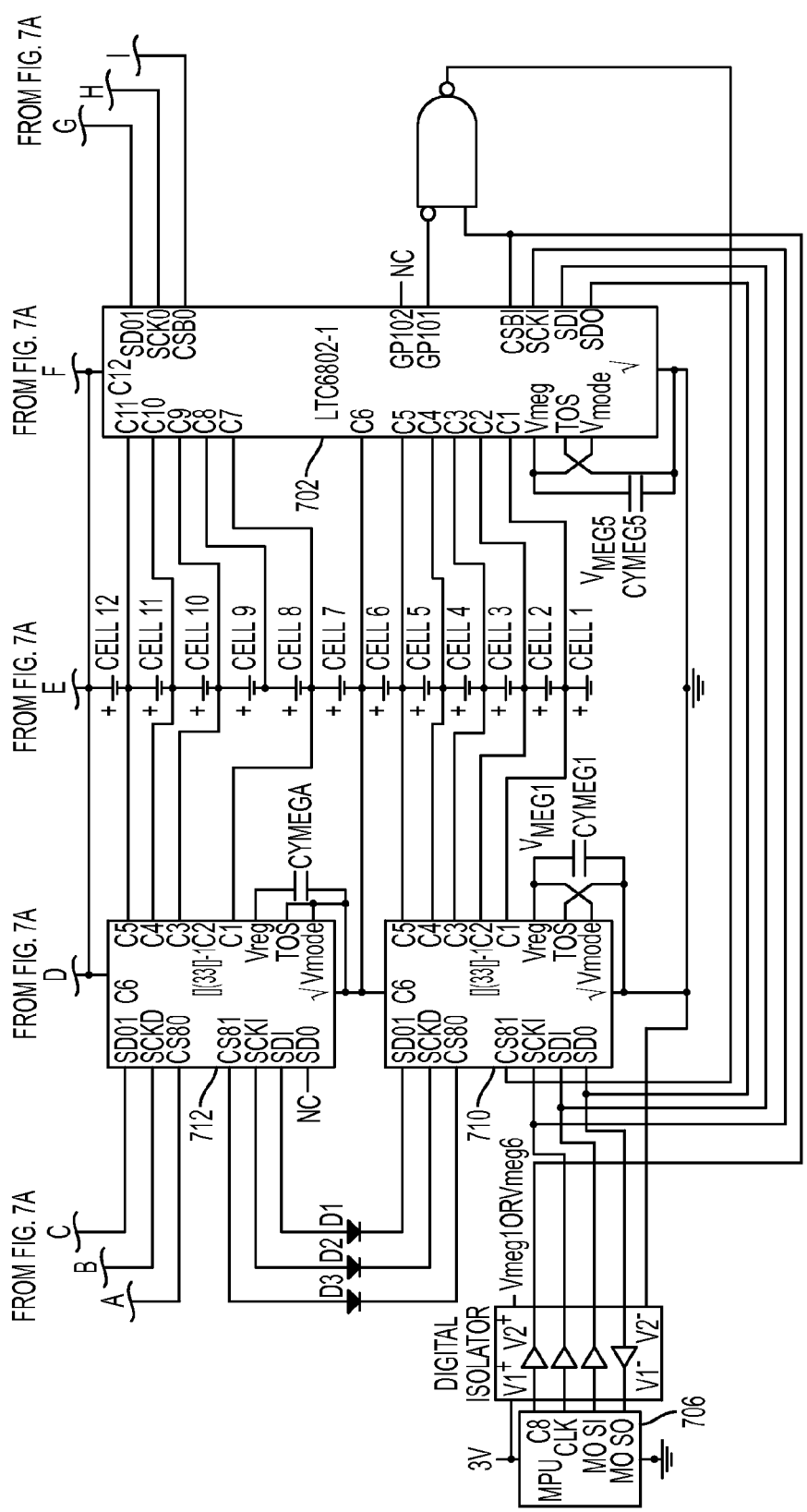

FIG. 7 is a simplified system diagram illustrating stackable serial communication, consistent with an embodiment of the invention. For example, to determine charge transfer requirements, at least one monitor module (e.g., 702 and 704) in connection with a microprocessor 706, may first determine the average SOC for each cell within each sub-stack (i.e., balancing modules 710 to 716). The voltage of a cell provides a measure of the SOC of the cell. If all cells have similar capacity, the cell with the lowest SOC (i.e., weakest cell) may receive additional charge from its sub-stack as a one time correction. For example, the entire sub-stack is used to provide charge to the weaker cell within its sub-stack. Thereafter, the entire sub-stack may cycle normally without any additional adjustments.

However, if a cell has a capacity different from normal cells (e.g., is damaged or degraded), this cell may be charged at a different rate than the normal cells. That is because a cell with less capacity charges faster than a normal cell (reaching a higher voltage faster than a normal cell). For example, with balancing, during a charging cycle of a battery stack, the weaker cell may receive less charge than the normal cells, thereby allowing all cells within the battery stack to achieve the same SOC at the end of the charge cycle.

In one embodiment, to preserve battery life, a cell is considered sufficiently charged at 70% SOC and sufficiently discharged at 30% SOC. Accordingly, during a charge cycle the normal cells and the defective cell of a battery stack are charged to 70% SOC at the same time. Similarly, during a discharge cycle, the normal cells and the defective cell discharge to 30% SOC at substantially same time.

As discussed above, monitor modules 702 and 704 may monitor the SOC of each cell. Each balancer in the system (i.e., 710 to 716) may be controlled by a microprocessor 706 using a single stackable communication interface 720. This daisy chained stackable interface allows balancers 710 to 716 to be controlled through a single communication port (I/O interface 720), irrespective of the number of cells in a series connected battery stack. Accordingly, a theoretically unlimited number of cells may be supported from a single communication port without the need for additional digital isolators.

Figure 6:
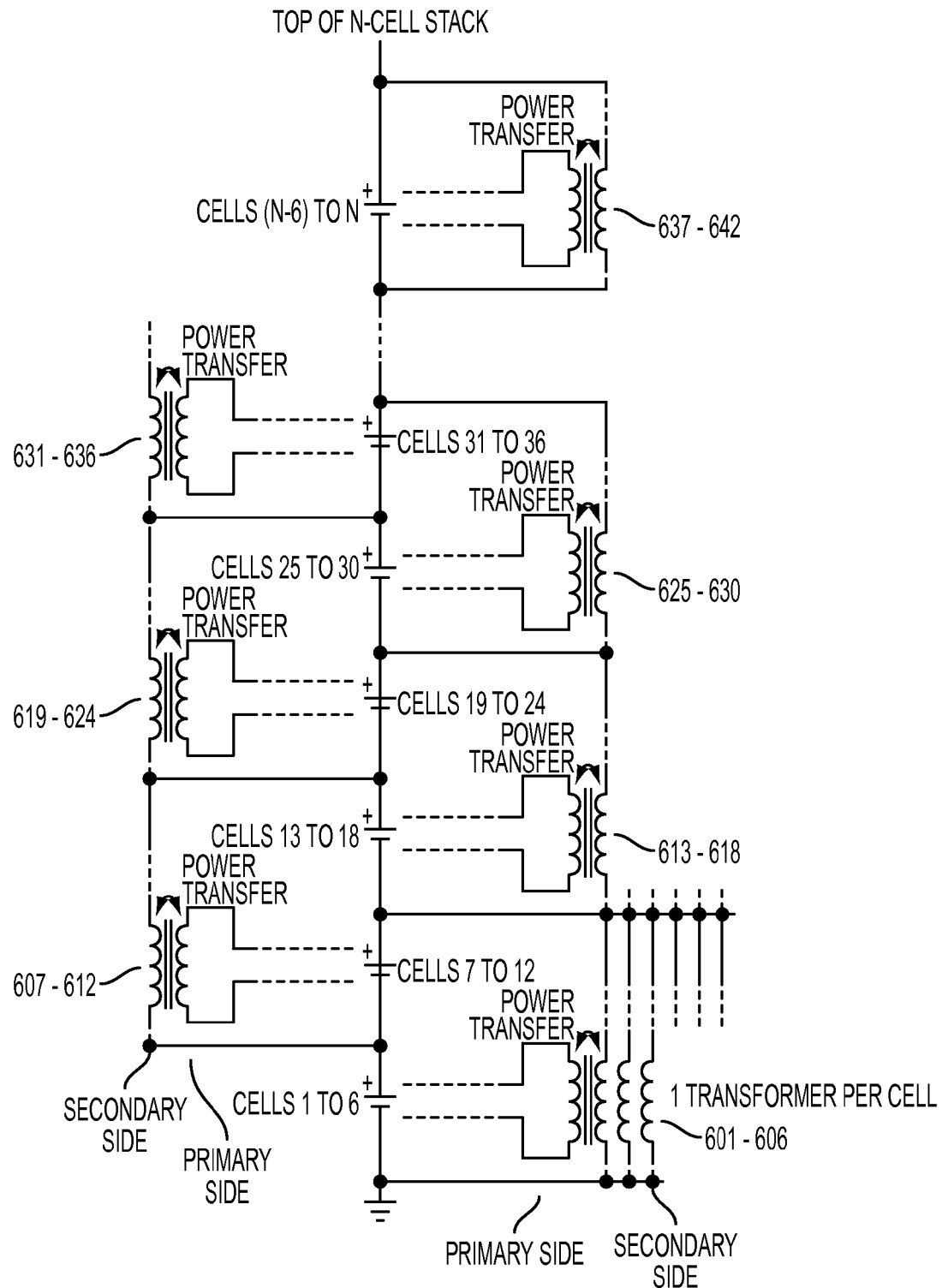
FIG. 6 Illustrates a circuit with transformer connections for balancing a plurality of interleaved battery sub-stacks, consistent with an embodiment of the invention.

FIG. 6 Illustrates a circuit with transformer connections for balancing a plurality of battery sub-stacks, consistent with an embodiment of the invention. Each sub-stack of cells (e.g., cells 1 to 6) is connected in series with an adjacent sub-stack (e.g., cells 7 to 12). Each cell within a sub-stack has a corresponding primary side of a transformer associated with it. By way of example, the primary side connections for transformers 601 to 606 are across each of the six cells in the lowest voltage sub-stack respectively. For example, the primary side of transformer 601 is across cell 1, the primary side of transformer 602 is across cell 2, etc. Further, each corresponding secondary side of the transformer connection is across the same sub-stack (i.e., cells 1-6) plus the adjacent higher voltage sub-stack (i.e., cells 7-12) in an interleaved configuration.

Accordingly, in this example, cells 7 to 12 are each associated with transformers 607-612. The coils of the secondary side of transformers 607-612 are associated with cells 7 to 12 and cells 13 to 18. In this example, assuming the average SOC of cells 25 to 30 is strong while the average SOC of cells 7 to 12 is weak, charge from cells 25 to 30 (i.e., strong sub-stack) can be transferred to cells 7 to 12 (i.e., weak sub-stack) by the following steps:

1. Charge cells 19 to 24: The secondary side of transformers 619-624 transfers charge from the strong sub-stack to cells 19 to 24 (i.e., first intermediary sub-stack) via its primary coils.

2. Charge cells 13 to 18: The secondary side of transformers 613-618 transfers charge from the first intermediary sub-stack to cells 13 to 18 (i.e., second intermediary sub-stack).

3. Charge cells 7 to 12: The secondary side of transformers 607-612 transfers charge from the second intermediary sub-stack to the weak sub-stack.

Accordingly, by the primary side of the transformer straddling cells within each sub-stack and the secondary side straddling a plurality (e.g., 2) of sub-stacks in an interleaved manner, any sub-stack can share the charge of another sub-stack, even if the other sub-stack is not adjacent to the weak (or strong) sub-stack.

As to interleaving sub-stacks, examples provided herein illustrate secondary sides of transformers reaching across two sub-stacks. Those skilled in the art will appreciate, in view of the specification, that the secondary sides of transformers can reach across as many adjacent sub-stacks as desired. For example, reaching across several sub-stacks may improve charge redistribution on a per balancer basis. In this regard, charge return current from a discharging cell is redistributed to a greater number of secondary side cells. Similarly, charge supply current for a cell being charged is sourced from a greater number of adjacent cells. Accordingly, the "discharging" of the secondary side sub-stacks is minimized. Thus, the other cells are impacted as little as possible when a particular cell is balanced. In one example, this is achieved by increasing the number of secondary side cells. Further, although six cells have been illustrated per sub-stack, the number of cells can be any number N, where N is ≥2.

The concept described above in connection with balancing a plurality of sub-stacks can be applied to balancing cells within a single sub-stack as well. By way of example, assuming that cell 1 (502) in FIG. 5 is a weak cell in the sub-stack comprising cells 1 to 6, normal cells 2 to 6 can provide part of their charge to weak cell 1 through their respective transformers.

Charge transfer is accomplished by alternately turning the power switches (e.g., 522, 523) connected to the transformer primary and secondary sides ON and OFF. This allows current to ramp up in one winding of the transformer (i.e., charge supply side) when its associated series power switch is ON, and then ramp down in the other winding (i.e., charge return side) when the charge supply side switch is turned OFF due to the stored energy in the transformer core. At this point, the power switch on the charge return side of the transformer (connected either to a cell or to a sub-stack) is turned ON to provide a low impedance path for the return current to flow. Return current may also conduct through the body diode of the return side power switch. Thus, current flows even if the return side switch is not turned ON. This cycle may repeat until sufficient charge has been transferred as determined by the respective monitoring modules (e.g., 702 and 704).

Cycle by cycle charge transfer control for each balancer is accomplished by directly sensing the transformer winding current through a series sense resistor (e.g. 524, 525). The charge supply side power switch is turned OFF as soon as the current ramping through the sense resistor reaches a predetermined peak voltage (i.e., the current flowing through the charge supply side transformer winding, power switch and sense resistor reaches a predetermined max value). Charge return side current is allowed to flow until the return side current has decayed to zero or near zero (as may be indicated by the voltage drop across the return side sense resistor). The cycle may repeat thereafter. Alternatively, current may be allowed to flow through the supply side power switch for a pre-determined time. The peak current in this instance is determined by the supply side ON time and the supply side winding inductance. As before, the return side current may flow until it decays to zero or near zero for a pre-determined time (e.g., sufficient to allow the current to decay to zero or near zero).

Figure 8:
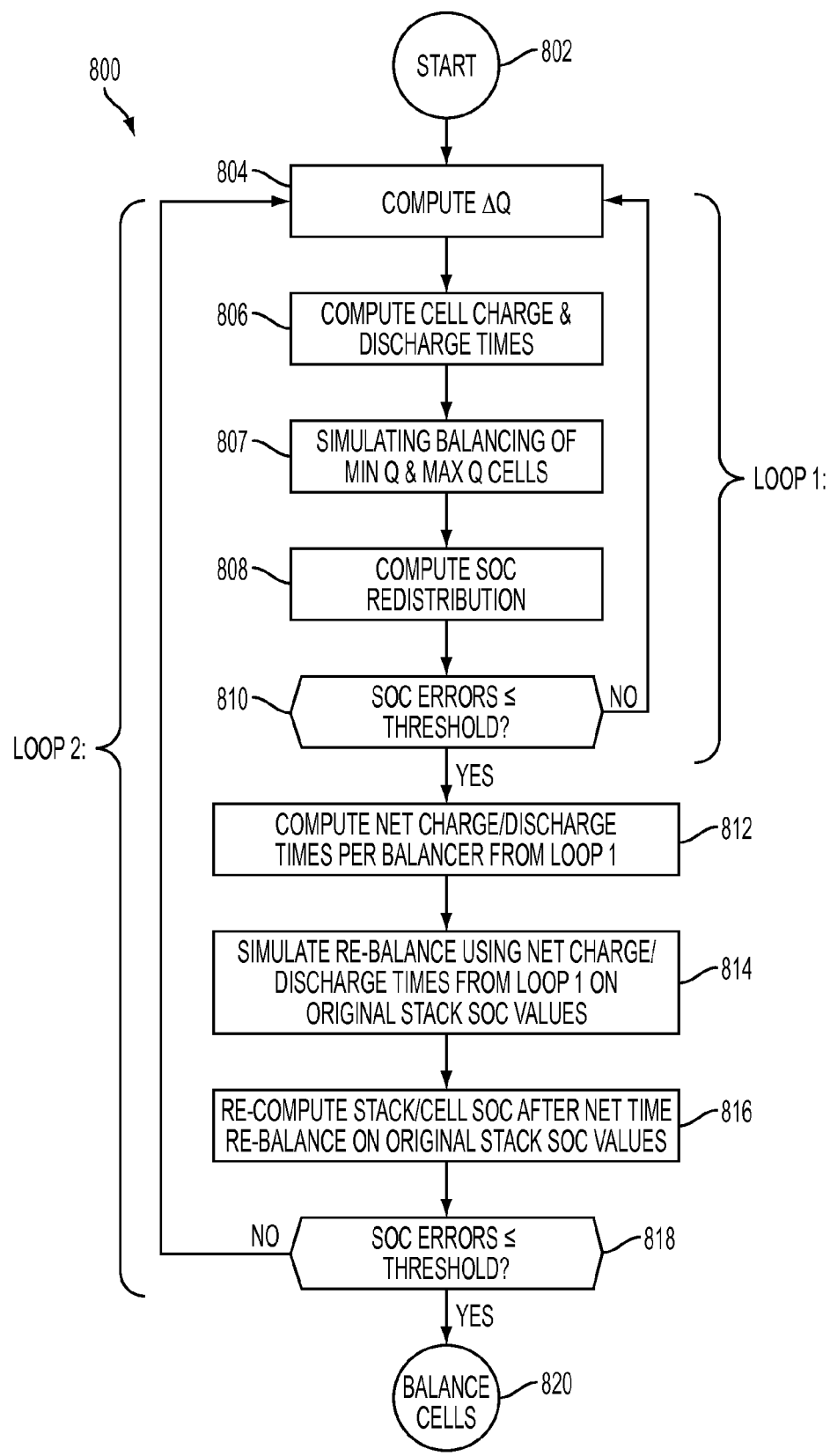
FIG. 8 illustrates an exemplary flow for balancing the charge of cells consistent with an embodiment of the invention.

FIG. 8 illustrates an exemplary flow 800 for balancing the state of charge of all cells. The method begins with step 802 and includes two loops. In step 804 of the first loop, the SOC of every cell in the battery stack is determined. For example, the battery stack may comprise a plurality of interleaved sub-stacks. From this determination, an average state of charge for the battery stack is calculated. For example, the average state of charge is determined by adding the state of charge for each cell (e.g., in every sub-stack) together and then dividing by the number of cells in the entire battery stack. The average state of charge is used to compute the difference in charge ($\Delta Q$) between a cell and an average cell within the battery stack. Put differently, $\Delta Q$ is the charge that should be added (or removed) from a cell to match the battery stack average SOC. The $\Delta Q$ calculation is performed for each cell. If there are several sub-stacks, this calculation can be performed for one sub-stack at a time or several sub-stacks concurrently.

Accordingly, the determination of the SOC for each cell includes a determination of the actual capacity of each cell. The SOC and the capacity of each cell is used to determine the $\Delta Q$, which is an absolute number. Thus, if the SOC of a cell can be determined, it is implicit that the capacity of the cell is known.

In step 806, it is determined what the charge times and discharge times per cell should be based on the $\Delta Q$ and $I_{BAL}$ (where $\Delta Q/I_{BAL}$=time).

In step 807, it is determined what the Min and Max Q cells are based on the previous steps. For example, a Min Q cell is the cell to which the most charge is to be added, whereas the Max Q cell is the cell from which the most charge is removed, in order to more closely adhere to the average SOC.

Min/Max Q is related to the present charge level of a cell relative to the charge level to match the average SOC level for all cells in the battery stack. For example, when fully discharged, a cell is at 0% state of charge; at completely charged, the cell is at 100% state of charge level.

As discussed before, a balancing of charge of a cell (e.g., Min and Max Q cells), affects the charge of the neighboring cells. That is because the cell where charge is transferred to, receives its charge from its neighboring cells. Similarly, for a strong cell, the charge that is removed therefrom goes to the neighboring cells. Accordingly, any balancing affects all the cells in the sub-stack and adjacent sub-stacks that are within the transformer secondary winding. In one embodiment, while the charge redistribution is calculated for every cell, the calculation is based on charge redistribution due to "balancing" Min/Max Q cells only. That is because the Min and Max Q cells transfer the most charge from/to adjacent cells. Limiting the simulated balancing to the Min/Max Q cells ensures that in every iteration in the calculation, the system is closer to having every cell balanced. For example, limiting the simulated balancing to the Min/Max Q cells ensures that the algorithm converges. Indeed, if the simulated balancing is not limited to the Min/Max Q cells there may be cases where the charge simply transfers back and forth between adjacent cells and only produces incremental improvements in the overall state of charge balance in the battery stack. In contrast, limiting the simulated balancing to the Min/Max Q cells of the battery stack generally ensures convergence.

In step 808, the SOC for each cell is computed after the calculated charge redistribution. This computation is different from the physical measurement of the SOC in step 804 discussed above. That is because in step 808 the SOC is mathematically calculated based on a theoretical charge redistribution whereas in step 804 there is a physical measurement.

In step 810 it is determined whether the SOC of each cell is less than or equal to a predetermined first threshold. If the SOC error of each cell is not less than or equal to a predetermined first threshold, then the iterative calculation process continues in loop 1 by going back to step 804. Put differently, if the SOC errors are too large between a cell and the average, the first loop is repeated. However, if the SOC of each cell is within a predetermined first threshold, then the method continues to compute the cumulative charge and discharge times per balancer for all iterations (i.e., step 812). Since balancing one cell may affect the state of charge of adjacent cells, cells requiring additional charge in one iteration may require removal of charge in another due to subsequent balancing of adjacent cells in later iterations. The amount of both charging and discharging of a cell to achieve SOC balance after numerous iterations is a function of the SOC error distribution and relative cell capacities of adjacent cells and may vary from battery stack to battery stack.

Step 812 is part of the second calculation loop. In this step, the net charge/discharge times per balancer from loop 1 are determined. For example, if balancer 1 required 7 min of charging and 1 min of discharging, 7−1 provides 6 minutes of charging and 0 min of discharging.

In step 814, the initial cell SOC values for each cell (i.e., values prior to any simulated "balancing" in loop 1) are used and the net charge/discharge times are applied to every balancer. In one embodiment, all of the cells in the battery stack are computationally rebalanced simultaneously due to the conservation of charge in a closed balancing system. Again, this is performed on a computational level (charge is not yet physically redistributed).

In step 816, the SOC of each cell in the battery stack is re-computed after the net time is used to computationally re-balance, using the initial cell SOC values in step 814 (i.e., values prior to any simulated "balancing" in loop 1). Thus, all resulting charge redistribution is accounted for. At this stage, the computed SOC levels for all cells will be closer to balance than at step 804, using only charge or discharge times for each balancer as necessary.

In step 818, it is determined whether the SOC errors are sufficiently small (less than or equal to a second predetermined threshold). The second predetermined threshold may be equal to or greater than the magnitude of the first predetermined threshold. If the SOC is not less than or equal to the second predetermined threshold, then the method continues with step 804 of the first loop, where the initial values for charge and discharge time and the initial SOC value for each cell that is used to compute the delta Q values for each cell are based on the mathematical result from steps 812 and 816. All subsequent executions of Step 804 are performed similarly. For example, only the first execution uses the actual battery stack measurements to determine the delta Q values. Subsequent iterations are based on the charge for each cell calculated in step 816. However, if the SOC errors are less than or equal to the second predetermined threshold, then the cells are balanced (i.e., step 820) based on the foregoing calculated values for each cell.

It may be helpful to now discuss the relationship between the second predetermined threshold and the first predetermined threshold. For example, when the net charge/discharge time is used at the beginning of loop two (i.e., step 812), the SOC balance may actually worsen or stay the same. Therefore, if the second threshold were smaller (i.e., a smaller SOC error is needed to exit the loop), an infinite loop may be created. Accordingly, the second predetermined threshold is typically greater than the magnitude of the first predetermined threshold.

The resulting NET charge (CHG) and discharge (DCHG) times represent the minimum balancer run times for each balancer. These are based on the initial measured SOC levels, assumed (or measured) balance currents, and balancer efficiency, to achieve balanced SOC for a given battery stack at any specific point in time. The balancers may now operate serially or concurrently for the resulting times to achieve SOC balance.

The foregoing method provides an optimization of balancing of cells for interleaved topologies including 2 or more sub-stacks. In this regard, the aggregate time that balancers run to achieve SOC balance throughout the battery stack is minimized. For example, charge conservation and superposition allow simultaneous balancer operation. Accordingly, the capacity recovery may be maximized and the total balancer run time and energy consumption minimized. Thus, the method computes and minimizes balancing time and minimizes balancer energy consumption based on predetermined balance current for each balancer.

Redundant balancing steps may be included in the first loop. Thus, the first loop provides SOC balance, but may still include redundant balancing steps. In this regard, the second loop is used to optimize run times by removing redundant balancing steps.

In one embodiment, the cells are balanced while a battery stack is charging and/or discharging such that all cells reach SOC balance at the battery stack charging/discharging end points. As discussed before, an SOC level of 30% may represent a min state of charge (reached when the battery stack is discharging) and an SOC level of 70% capacity may represent a max state of charge (reached when the battery stack is charging). One skilled in the art will readily realize that other values may be used depending on the type of batteries and other specific conditions. By predicting the charge and discharge times to achieve balance at the operating endpoints, the minimum balancer operating time during battery stack charge and discharge cycles may be determined.

For example, calculating extrapolated values for cell SOC errors may include the capacity of each cell (i.e., capacity when fully charged), the current SOC, and the remaining capacity for all cells. For this example, it is also assumed that battery stack charge and discharge currents apply to each cell equally. It should be noted that in this example the charge and discharge currents are not balancing currents. Rather, these currents refer to the load and charge currents for the entire battery stack (e.g., consider a battery stack as a single battery). The method for determining end point balancing while a battery stack is charging or discharging is described in more detail below.

By way of example, the following describes how to determine the extrapolated remaining capacity per cell and extrapolated SOC per cell when the average SOC of all cells reaches 70%. A cell's remaining capacity (A*hrs) using a Battery Monitor System (BMS) is determined by the following:

Remaining Capacity=(Current SOC)*(Cell Max Capacity).

Next, the charge added to each cell to reach the 70% SOC end point (on average) for the battery stack is calculated:

Added Capacity=(0.70−Battery Stack Avg SOC)* (Battery Stack Avg Max Capacity)

The extrapolated "70%" capacity, "70%" SOC per cell is calculated by the following:

"70%" Capacity=(Remaining Capacity)+(Added Capacity)

"70%" SOC=("70%" Capacity)/(Cell Max Capacity)

The "70%" SOC errors and additional charge/discharge balancing times to correct these errors may be calculated using the methodology discussed above. Similarly, the extrapolated "30%" endpoint SOC errors may be calculated. For example, each cells' remaining capacity (A*hrs) using a BMS is determined by the following:

Remaining Capacity=(Current SOC)*(Cell Max Capacity)

Further, the charge removed from each cell to reach the 30% SOC end point (on average) for the battery stack may be calculated by the following:

Removed Capacity=(Battery Stack Avg SOC−0.30)* (Battery Stack Avg Max Capacity)

The extrapolated "30%" capacity, "30%" SOC per cell may be calculated by the following:

"30%" Capacity=(Remaining Capacity)−(Removed Capacity)

"30%" SOC=("30%" Capacity)/(Cell Max Capacity)

The "30%" SOC errors and the additional charge/discharge balancing times to correct these errors may be calculated using the same method as discussed above.

As to the "30%"/"70%" Balancing Duty Factor (BDF), in one embodiment, once the charge and discharge balancing times are computed to achieve balance at one or the other SOC end point, the balancers may be operated on an "as needed" basis depending on how quickly the battery stack is charging or discharging. The ratio of balancer ON time to OFF time (i.e., duty factor) may be determined based on the following ratios on a per balancer basis:

"30%" Duty Factor=("30%" Bal Time)/(Battery Stack Dchg Time to 30% Avg SOC)

"70%" Duty Factor=("70%" Bal Time)/(Battery Stack Chg Time to 70% Avg SOC)

The 30% and 70% Balancing Duty Factors represent the proportion of time that each balancer may operate to provide that all the cells reach SOC balance by the time the battery stack reaches either the 30% or 70% average SOC end point. This ON time to OFF time ratio varies with the overall battery stack load and battery stack charge currents. For example, if the battery stack is charging or discharging slowly, the 30%/70% duty factors are low. Thus, the balancers need not run very often if at all. For example, given that the future direction of the charge and discharge currents are unknown, a reasonable approach may be to only run the balancers when the Duty Factor is equal to some value close to but less than 100%, so it is guaranteed that the balancers have ample time to complete their task before the SOC limits are reached. In this way, no capacity is consumed by the balancer, unless and until it is required to either extend the runtime of the battery stack, in the case of reaching the lower SOC limit or protect a cell from overcharge in the case of reaching the upper SOC limit. The times for the battery stack to reach the 30%/70% average SOC end points are based on the battery stack average cell capacity (i.e., average capacity of every cell in the battery stack), battery stack average SOC, and the battery stack charge and discharge currents as follows:

Battery Stack Dchg Time to 30% Avg SOC=(Avg SOC−0.30)*Battery Stack Avg Cell Capacity/ Battery Stack Dchg Current Battery Stack Chg Time to 70% Avg SOC=(0.70−Avg SOC)*Battery Stack Avg Cell Capacity/Battery Stack Chg Current For example, the benefit of 1) predicting and balancing based on the extrapolated end point SOC errors and 2) balancing as needed based on the "30%/70%" BDF is that the cumulative balancer run time to achieve SOC balance at the end of a complete battery stack charge and discharge may be minimized. In this regard, as the overall (Net) direction for battery stack charging vs. discharging and corresponding battery stack average SOC changes, the corresponding balancing times (and directions) may change as well.

Although a single defective cell is discussed in the examples above, those skilled in the art will realize, in view of the disclosure, that the same concepts disclosed herein can be applied to a plurality of defective cells in the same sub-stack or battery stack. The terms "stack" and "sub-stack" are used interchangeably herein to refer broadly to a group of adjacent cells. Further, in some embodiments, a battery stack may comprise several sub-stacks. One skilled in the art will readily realize based on this disclosure that the methodologies discussed herein can be extended to include groups of interleaved sub-stacks which comprise the battery stack as a whole.

The teachings outlined above may be implemented as methods of processing data from a measuring tool applied to a computer, to provide the balancing of charge on cells. The teachings may also be embodied in a software product, essentially a program, for causing a computer or other data processing device to perform the data processing outlined above.

Terms such as "machine-readable medium" and "computer-readable medium" refer to any medium that participates in providing instructions and/or data to a programmable processor, such as the CPU of a personal computer, server or host computer that may process the charge measurement data. Such a medium may take many forms, including but not limited to, non-volatile media, volatile media, and transmission media. Non-volatile media include, for example, optical or magnetic disks. Volatile media include dynamic memory, such as main memory or cache. Physical transmission media include coaxial cables; copper wire and fiber optics, including wired and wireless links of the network and the wires that comprise a bus within a computer or the like. Transmission media, however, can also take the form of electric or electromagnetic signals, or acoustic or light waves such as those generated during optical, radio frequency (RF) and infrared (IR) data communications.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

What is claimed is:

1. A battery balancing system comprising:
a plurality of cells connected in series, wherein the plurality of cells includes a Min Q cell and a Max Q cell;
a balancer for each cell;
a monitor configured to determine a state of charge (SOC) of each cell;
a microprocessor configured to:
iteratively calculate a SOC error for each cell, based on a theoretical balancing of the Min Q cell and the Max Q cell, until the SOC error for each cell is less than or equal to a predetermined first threshold;
while the SOC error is less than or equal to a predetermined first threshold, iteratively re-calculate the SOC error for each cell using a calculated net charge or discharge time for each balancer until the SOC error for each cell is less than or equal to a predetermined second threshold; and
when the SOC error is less than or equal to a predetermined second threshold, instruct each balancer to physically balance each respective cell based on the respective calculated net charge or discharge time by adding or removing charge to or from each respective cell.

2. The battery balancing system of claim 1, wherein the microprocessor is further configured to:
instruct the monitor to determine a first SOC of each cell;
calculate an average SOC of the plurality of cells;
calculate a difference in charge (ΔQ) between each cell and the average SOC; and
calculate a charge or discharge time for each cell in the battery such that each cell matches the average SOC.

3. The battery balancing system of claim 1, wherein the Min Q cell is a cell requiring a most added charge and the Max Q cell is a cell requiring a most amount of charge removal to reach the average SOC.

4. The battery balancing system of claim 1, wherein:
the Min Q cell requires a largest charge from the battery to match the average SOC; and
the Max Q cell requires to donate a largest charge to the battery to match the average SOC.

5. The battery balancing system of claim 1, wherein the battery comprises a plurality of series connected sub-stacks.

6. The battery balancing system of claim 5, wherein all sub-stacks are balanced concurrently.

7. The battery balancing system of claim 5, wherein each sub-stack is balanced serially.

8. The battery balancing system of claim 1, wherein a magnitude of the first threshold is equal to a magnitude of the second threshold.

9. The battery balancing system of claim 1, wherein a magnitude of the first threshold is smaller than a magnitude of the second threshold.

10. A method of balancing a battery stack, the method comprising:
performing first loop calculations by:
determining a first state of charge (SOC) of each cell in the battery stack;
calculating an average SOC for the battery stack;
calculating a difference in charge (ΔQ) between each cell and the average SOC for the battery stack;
calculating a charge or discharge time for each cell in the battery stack such that each cell matches the average SOC for the battery stack;
determining a Min Q cell and a Max Q cell based on the ΔQ of each cell;
calculating a charge distribution for each cell in the battery stack based on a calculated balancing of the Min Q cell and the Max Q cell for the battery stack;
calculating a second SOC for each cell in the battery stack based on the calculated balancing of the Min Q cell and the Max Q cell;
determining a SOC error for each cell in the battery stack by calculating a percentage difference between the second SOC of the cell and the average SOC; and
if the magnitude of the SOC error is above a predetermined threshold, then going back to the step of calculating the ΔQ of each cell in the battery stack; otherwise,
calculating cumulative charge and discharge times for each balancer; and
performing second loop calculations while the magnitude of the calculated SOC is less than or equal to the predetermined first threshold, by:
calculating a net charge or discharge time for each cell based on first loop calculations;
computationally rebalancing each cell using net charge/discharge times for each cell based on first loop calculations and the determined first SOC of each cell;
calculating a third theoretical SOC of each cell in the battery stack;
if a magnitude of any cell of the battery stack is above a predetermined second threshold, then going back to the step of calculating an average SOC for the battery stack of the first loop calculations using the third theoretical SOC of each cell; otherwise,
physically balancing each cell by adding or removing charge to or from each cell based the net charge or discharge time for each cell respectively.

11. The method of claim 10, wherein calculating the charge or discharge time for each cell in the battery stack is based on the ΔQ of each cell and a balancing current ($I_{BAL}$).

12. The method of claim 10, wherein the Min Q cell is a cell requiring a most added charge and the Max Q cell is a cell requiring a most amount of charge removal to reach the average SOC in the battery stack.

13. The method of claim 10, wherein:
the Min Q cell requires a largest charge from the battery stack to match the average SOC; and
the Max Q cell requires to donate a largest charge to the battery stack to match the average SOC.

14. The method of claim 10, wherein the battery stack comprises a plurality of series connected sub-stacks.

15. The method of claim 14, wherein all sub-stacks are balanced concurrently.

16. The method of claim 14, wherein each sub-stack is balanced serially.

17. The method of claim 10, wherein the calculation of the ΔQ for each cell is performed concurrently.

18. The method of claim 10, wherein a magnitude of the first threshold is equal to a magnitude of the second threshold.

19. The method of claim 10, wherein a magnitude of the first threshold is smaller than a magnitude of the second threshold.

20. A method of balancing a battery stack, the method comprising:
in a first calculation loop:
determining a first state of charge (SOC) of each cell in the battery stack;
calculating an average SOC for the battery stack;

calculating a charge to add to or remove from each cell in the battery stack such that a resulting charge in each cell in the battery stack is closer to the average SOC of the battery stack;

simulating a charge redistribution based on the calculated charge to add or remove from each cell in the battery stack;

calculating a second SOC for each cell based on the simulated charge redistribution;

iteratively repeating the first calculation loop by going back to the step of calculating an average SOC for the battery stack, until a SOC error of each cell is within a predetermined first threshold; wherein in each iteration, a charge or discharge time for each cell is recorded;

in a second calculation loop:

reducing charge balancing time for each cell in the battery stack by computing a net charge or discharge time for each cell based on the recorded iterative charge or discharge time calculation for each cell from the first calculation loop;

simulating a balancing of each cell based on the reduced charge balancing time and the first SOC for each cell;

determining a new SOC error for each cell in the battery stack; and if the magnitude of the new SOC error is above a predetermined second threshold then repeating the first loop calculations by going back to the step of calculating the charge to add to or remove from each cell in the battery stack such that a resulting charge in each cell in the battery stack is closer to the average SOC of the battery stack;

otherwise, balancing each cell in the battery stack based on the net charge or discharge time.

21. The method of claim 20 wherein simulating the charge redistribution for each cell in the battery stack is based on:

calculating a difference in charge ($\Delta Q$) between each cell and the average SOC for the battery stack;

determining a Min Q cell and a Max Q cell based on the $\Delta Q$ of each cell;

calculating a balancing of a Min Q cell and a Max Q cell for the battery stack; and calculating a charge or discharge time for each cell in the battery stack.

22. The method of claim 21, wherein the calculating a charge or discharge time for each cell in the battery stack is based on the $\Delta Q$ of each cell and a balancing current ($I_{BAL}$).

23. The method of claim 21, wherein the Min Q cell is a cell requiring a most added charge and the Max Q cell is a cell requiring a most amount of charge removal to reach the average SOC in the battery stack.

24. The method of claim 20, wherein the a battery stack comprises a plurality of series connected sub-stacks.

25. The method of claim 24, wherein all sub-stacks are balanced concurrently.

26. The method of claim 24, wherein each sub-stack is balanced serially.

27. The method of claim 21, wherein the calculation of the $\Delta Q$ for each cell is performed concurrently.

28. The method of claim 20, wherein a magnitude of the first threshold is equal to the magnitude of a second threshold.

29. The method of claim 20, wherein a magnitude of the first threshold is smaller than the magnitude of a second threshold.

* * * * *